(12) United States Patent
Ishihara

(10) Patent No.: US 6,813,063 B2
(45) Date of Patent: Nov. 2, 2004

(54) EXCITON POLARITON OPTICAL SWITCH

(75) Inventor: Teruya Ishihara, Wako (JP)

(73) Assignees: Japan Science and Technology Agency, Kawaguchi (JP); Riken, Wako (JP)

(*) Notice: Subject to any disclaimer, the term of this patent is extended or adjusted under 35 U.S.C. 154(b) by 0 days.

(21) Appl. No.: 10/344,003

(22) PCT Filed: Aug. 17, 2001

(86) PCT No.: PCT/JP01/07090

§ 371 (c)(1),
(2), (4) Date: Feb. 13, 2003

(87) PCT Pub. No.: WO02/17011

PCT Pub. Date: Feb. 28, 2002

(65) Prior Publication Data

US 2004/0027645 A1 Feb. 12, 2004

(30) Foreign Application Priority Data

Aug. 18, 2000 (JP) ..................... 2000-248164

(51) Int. Cl.$^7$ ............................ G02F 1/29; G02F 1/03; G02F 1/00; H01L 29/06; G02B 6/12
(52) U.S. Cl. ..................... 359/320; 359/321; 359/246; 359/248; 359/276; 359/563; 359/299; 257/17; 257/21; 385/3; 385/14; 250/351
(58) Field of Search ............................. 359/245, 299, 359/246, 247, 248, 249, 251, 276, 320, 321, 563, 566; 257/17, 21, 22; 385/3, 5, 14; 250/351, 343; 372/27, 96

(56) References Cited

U.S. PATENT DOCUMENTS 4,915,482 A    4/1990  Collins et al.
5,157,537 A  * 10/1992  Rosenblatt ............... 359/245
5,323,019 A  *  6/1994  Dutta et al. .............. 257/17
5,337,183 A  *  8/1994  Rosenblatt ............... 359/248
5,659,560 A  *  8/1997  Ouchi et al. .............. 372/27
6,177,674 B1 *  1/2001  Rutt et al. ................ 250/351
6,374,003 B1 *  4/2002  Ding et al. ............... 385/14

OTHER PUBLICATIONS

T. Fujita et al.; Physical Review B, vol. 57, No. 19, pp. 12428–12434, May 15, 1998. See PCT search report.

T. Ishihara; Optical Nonlinearity in Semiconductors with Dielectric Modulation Structure—94KK—122, pp. 145–149, 1997.

* cited by examiner

Primary Examiner—Loha Ben
(74) Attorney, Agent, or Firm—Westerman, Hattori, Daniels & Adrian, LLP

(57) ABSTRACT

A waveguide having a periodic structure and the excitation of exciton polariton as one form of interactions between radiation fields and matter systems are applied to light switching to provide an optical switch that is excellent in light intensity extinction ratio and operable at a speed in the terahertz order. The optical switch includes a polariton and photon interacting region (5) made of a grating (3) formed on a top face of a transparent substrate (2) and a semiconductor layer (4) with which the grating (3) is covered. The polariton and photon interacting region (5) is irradiated from a free space with a controllable light (7) having a preestablished wavelength and also from a free space with a control light (6) having a preselected wavelength to control the transmissivity of the controllable light (7) through the polariton and photon interacting region (5).

9 Claims, 12 Drawing Sheets

| $E_g(eV)$ | $E_{ex}(eV)$ | $E_b(meV)$ | $f_{ex}$ |
|---|---|---|---|
| 2.62 | 2.4 | 220 | 0.5 |

| $L_{well}(Å)$ | $L_{barrier}(Å)$ | $\varepsilon_{well}$ | $\varepsilon_{barrier}$ |
|---|---|---|---|
| 6.36 | 9.82 | 6.1 | 3.22 |

EXCITON POLARITON OPTICAL SWITCH

TECHNICAL FIELD

The present invention relates to an optical switch that utilizes a waveguide having a periodic structure, and narrow band absorption lines by exciton polariton.

BACKGROUND ART

In digital light communications, demands for the higher information transmission rate, i.e., the higher bit rate know no limits. In the conventional optical switch, the light emission source may be a laser diode whose current or voltage is controlled to turn its light emission on and off, thereby forming a "1" and a "0" digital light signal. Such a method of producing digital light signals by controlling the current passed through or the voltage applied to a laser diode, however, has its limit in decreasing the parasitic circuit capacitance and inductance and increasing the electron transit velocity, and hence has its limit in increasing the bit rate.

Attempts have also be made to rapidly produce digital light signals with the aid of a light modulator using an optical crystal such as $LiNbO_3$ (lithium niobate) with a laser light incident thereon to give rise to an electrooptic effect. This method has its limits, too, namely in matching the propagation speed of a light wave used and the propagation speed of a microwave applied for controlling the light wave, and the bit rate achievable there must be at most in the GHz (giga-hertz) order. Moreover, with the microwave propagation loss that cannot be ignored, the method has the problem that the 0 by 1 ratio in light intensity, namely the light intensity extinction ratio remains unsatisfactory.

Amid the state of the art, with the progress in crystal growth and semiconductor ultra-fine processing technologies made in recent years it has become possible to make a semiconductor quantum structure practically at will. This has also been followed by vigorous studies on the interaction between radiation field and elementary excitation of materials, using a photonic crystal or a semiconductor micro-resonator. Not only have the results of these studies contributed to the understanding of the fundamental physics, but also they are found applicable to the development of a high-performance optical device.

With the foregoing technological background, the present invention is aimed to provide an optical switch that has an excellent light intensity extinction ratio and is operable at a rate in the THz (tera-hertz) order, by applying to the switching of a light, a waveguide having a periodic structure and the excitation of exciton polariton as one form of the interaction between a radiation field and an elementary excitation of a material.

DISCLOSURE OF THE INVENTION

In order to achieve the object mentioned above, there is provided in accordance with the present invention an optical switch characterized in that it comprises: a polariton and photon interacting region made of a grating formed on a top face of a transparent substrate and a semiconductor layer with which the said grating is covered; a controllable light emitted from a free space and having a selected wavelength and with which the said polariton and photon interacting region is irradiated; and a control light for controlling transmissivity of the said controllable light through the said polariton and photon interacting region.

The said control light preferably has a wavelength that brings about an optical Stark effect of exciton without entailing an actual excitation of the said semiconductor layer.

The said grating is preferably formed so that its grating period corresponds to a length of m/2 of the wavelength of the said controllable light in the said semiconductor layer where m is a positive integer.

Further, the said semiconductor layer may be layered in a groove of the said grating to a predetermined depth.

The said semiconductor layer is preferably a semiconductor layer that is large in both exciton oscillator strength and exciton binding energy. The said semiconductor layer that is large in both exciton oscillator strength and exciton binding energy is preferably a semiconductor layer having a multiple quantum well structure made of units each of which comprises a pair of semiconductor quantum well and a barrier layer small in dielectric constant and separating the said semiconductor quantum wells from each other.

The said multiple quantum well structure that is large in both exciton oscillator strength and exciton binding energy is specifically of a laminar or layered inorganic-organic perovskite semiconductor that is expressed by chemical formula: $(C_nH_{2n+1}NH_3)_2MX_4$ where M=Pb or Sn and X=I, Br or Cl and n is a positive integer.

The said polariton and photon interacting region is preferably formed on its top face with a highly refractive transparent material for light confinement. The said highly refractive transparent material for light confinement is preferably a polymer.

In the optical switch of the present invention constructed as mentioned above, making the controllable light incident on the polariton and photon interacting region perpendicularly thereto causes a standing wave of the controllable light to be formed in a direction of the grating period of the grating. Photon of this standing wave is strongly coupled to exciton of the semiconductor to form exciton polariton and is thereby absorbed. Thus, the controllable light is prevented from passing through the polariton and photon interacting region.

On the other hand, making both the controllable light and the control light simultaneously incident on the polariton and photon interacting region allows the energy of exciton in the semiconductor layer to be rapidly changed by the control light causing the optical Stark effect to change the dispersion relation of polariton that is a state that exciton and photon are strongly coupled, thereby changing the photon energy of the standing wave strongly coupled with exciton of the semiconductor. Thus, the controllable light is prevented from coupling with exciton and is thereby allowed to pass through the polariton and photon interacting region. Selecting the grating period allows the wavelength of the light forming the standing wave to be selected.

Also, increasing the number of the grooves forming the grating allows setting the very narrow half-width of the wavelength of the light that forms the standing wave. Moreover, the control means for controlling the transmissivity by bringing about the third order optical nonlinear effect, preferably the optical Stark effect, permits controlling the controllable light so as to render it transmissible and nontransmissible very rapidly or at an ultra-high speed.

Further, the use of a semiconductor layer that is large in both exciton oscillator strength and exciton binding energy allows almost every photon of the standing wave to be converted to exciton polariton, thereby further raising the light intensity extinction ratio of the optical switch.

If the semiconductor layer that is large in both exciton oscillator strength and exciton binding energy is constituted by a semiconductor layer having a multiple quantum well structure made of units each of which comprises a pair of semiconductor quantum well and a barrier layer small in dielectric constant and separating the said semiconductor quantum wells from each other, then extremely high exciton oscillator strength and exciton binding energy are obtained.

Further, the use of a laminar or layered inorganic-organic perovskite semiconductor that is expressed by the chemical formula: $(C_nH_{2n+1}NH_3)_2MX_4$ where M=Pb or Sn and X=I, Br or Cl and n is a positive integer, provides for a multiple quantum well structure that is large in both exciton oscillator strength and exciton binding energy.

Further, if the polariton and photon interacting region is formed on its top face with a highly refractive transparent material for light confinement, then the improvement in the light confinement into the polariton and photon interacting region still further enhances the light intensity extinction ratio of the optical switch.

Constructed as mentioned above, the optical switch according to the present invention is operable extremely rapidly, namely at a speed in the tera-hertz order and is excellent in light intensity extinction ratio.

BRIEF DESCRIPTION OF THE DRAWINGS

The present invention will better be understood from the following detailed description and the drawings attached hereto showing certain illustrative embodiments of the present invention. In this connection, it should be noted that such forms of embodiment illustrated in the accompanying drawings hereof are intended in no way to limit the present invention but to facilitate an explanation and understanding thereof. In the drawings:

FIGS. 1A and 1B are typical views illustrating a makeup and an operation, respectively, of an exciton polariton optical switch according to the present invention, wherein FIG. 1A shows the of the exciton polariton optical switch and FIG. 1B is a graph showing how the dip of the intensity of a light for transmission changes when a control light is switched on and off;

FIG. 4A shows a stereostructure of a unit cell (with the alkyl chain omitted) and FIG. 4B is a schematic projection diagram of its crystallographic structure in the directions of a- and b-axes;

FIG. 6 is a table showing actual measurements of exciton binding energy $E_b$, band gap $E_g$, exciton absorbing energy $E_{ex}$, exciton oscillator intensity $f_{ex}$, quantum well width $L_{well}$, quantum well dielectric constant $\epsilon_w$ and barrier layer dielectric constant $\epsilon_b$ of PhE-PbI4 used in a specific implementation of the present invention;

BEST MODES FOR CARRYING OUT THE INVENTION

Figure 1:
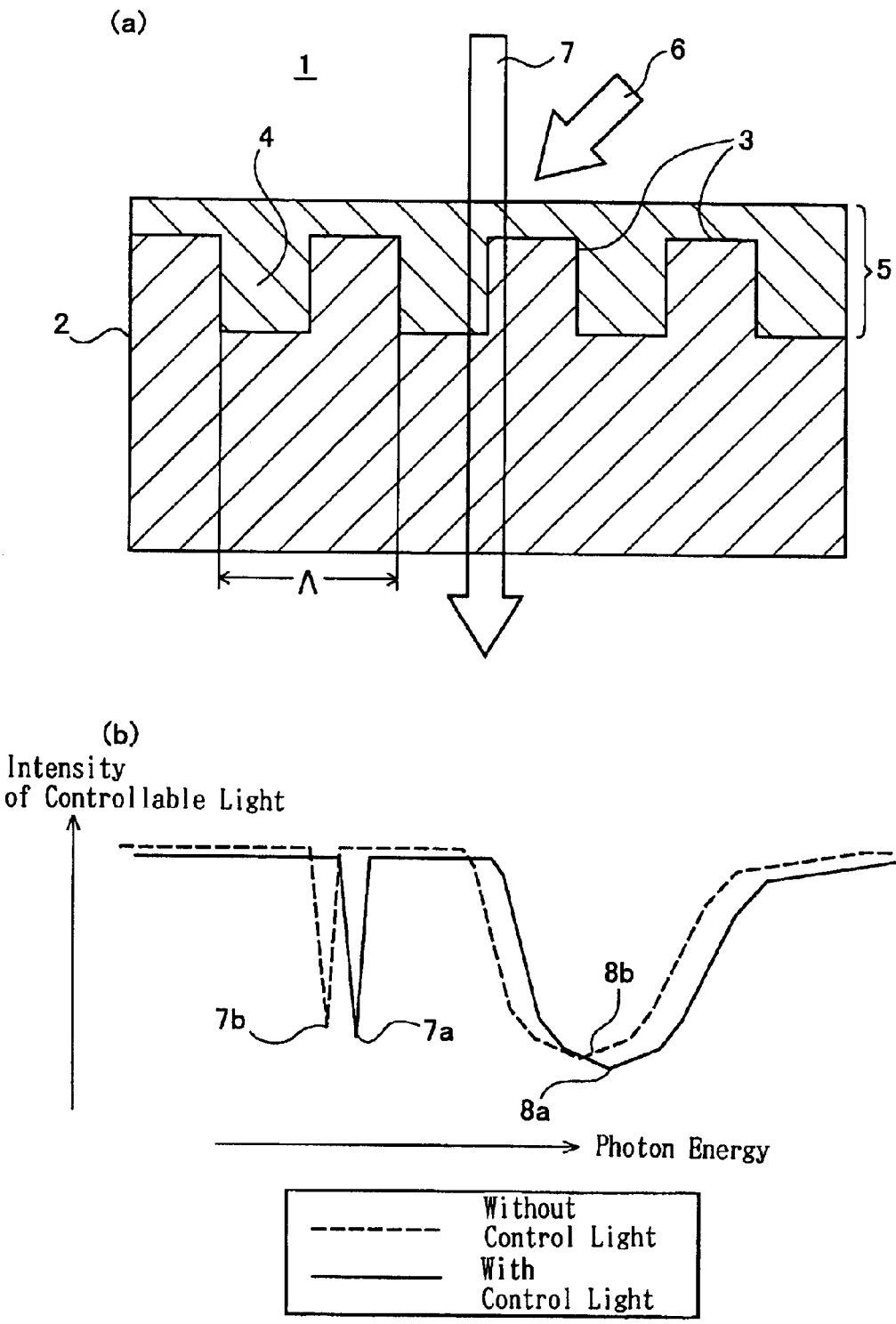

An explanation is given in detail below in respect of forms of embodiment of the present invention with reference to the accompanying drawing Figures wherein the same reference characters are used to designate the substantially same members or components.

FIGS. 1A and 1B are typical views illustrating a makeup and an operation, respectively, of an exciton polariton optical switch according to the present invention, wherein FIG. 1A shows the makeup of the exciton polariton optical switch and FIG. 1B is a graph showing how the dip of the transmission intensity of a controllable light changes when a control light is switched on and off Referring to FIG. 1A, an exciton polariton optical switch 1 according to the present invention comprises a transparent substrate 2 formed on its top face with a grating 3 having a grating period Λ, and a semiconductor layer 4 with which the grating 3 is covered to coat the same. The region of the grating 3 covered with the semiconductor layer 4 and designated by reference character 5 is herein referred to as "polariton and photon interacting region".

The exciton polariton optical switch 1 of the present invention can be operated by externally applying thereto a control (controlling) light 6 of a particular wavelength and a controllable (controlled) light 7 of a specified wavelength.

FIG. 1B is a graph that shows how the light transmission of the polariton and photon interacting region 5 is dependent upon photon energy when it is irradiated with the control light 6 and when it is not, respectively. In the graph of FIG. 1B, the photon energy is plotted along the abscissa axis and the light transmission is plotted along the ordinate axis. The solid and broken lines indicate the dependencies on the photon energy of the light transmissions of the polariton and photon interacting region 5 when it is irradiated with the control light 6 and when it is not, respectively. There are shown dips 7a and 7b which are dips by absorption of exciton polariton in the presence and absence of the control light, respectively; and dips 8a and 8b which are dips by absorption of exciton of the semiconductor layer 4 in the presence and absence of the control light 6, respectively.

For operating the exciton polariton optical switch 1 of the present invention, the photon energy of the controlled light 7 is made coincidence with the the exciton polariton absorption dip 7b in the absence of the control light 6. In the absence of the control light 6, the controlled light 7 is absorbed by the exciton polariton absorption dip 7b and is not transmitted through the polariton and photon interacting region 5. Irradiating the polariton and photon interacting region 5 with the control light 6 causes the exciton polariton absorption dip to be shifted to 7a and allows the controlled light 7 to be transmitted through the polariton and photon interacting region 5.

As opposed to the above, it is also possible to make the photon energy of the controlled light 7 to be coincidence with the exciton polariton absorption dip 7a in the presence of the control light 6. Then, the controlled light 7 is absorbed by the exciton polariton absorption dip 7a and is not transmitted through the polariton and photon interacting region 5 while it is being irradiated with the control light 6. Cutting off the control light 6 shifts the exciton polariton absorption dip to 7b, and allows the controlled light 7 not absorbed to pass through the polariton and photon interacting region 5. In this manner, the exciton polariton optical switch 1 of the present invention operates to make it transparent and nontransparent to the controlled light 7 when the control light 6 is turned on and off.

An explanation is next given in respect of the operating principles of an exciton polariton optical switch according to the present invention.

Figure 2:
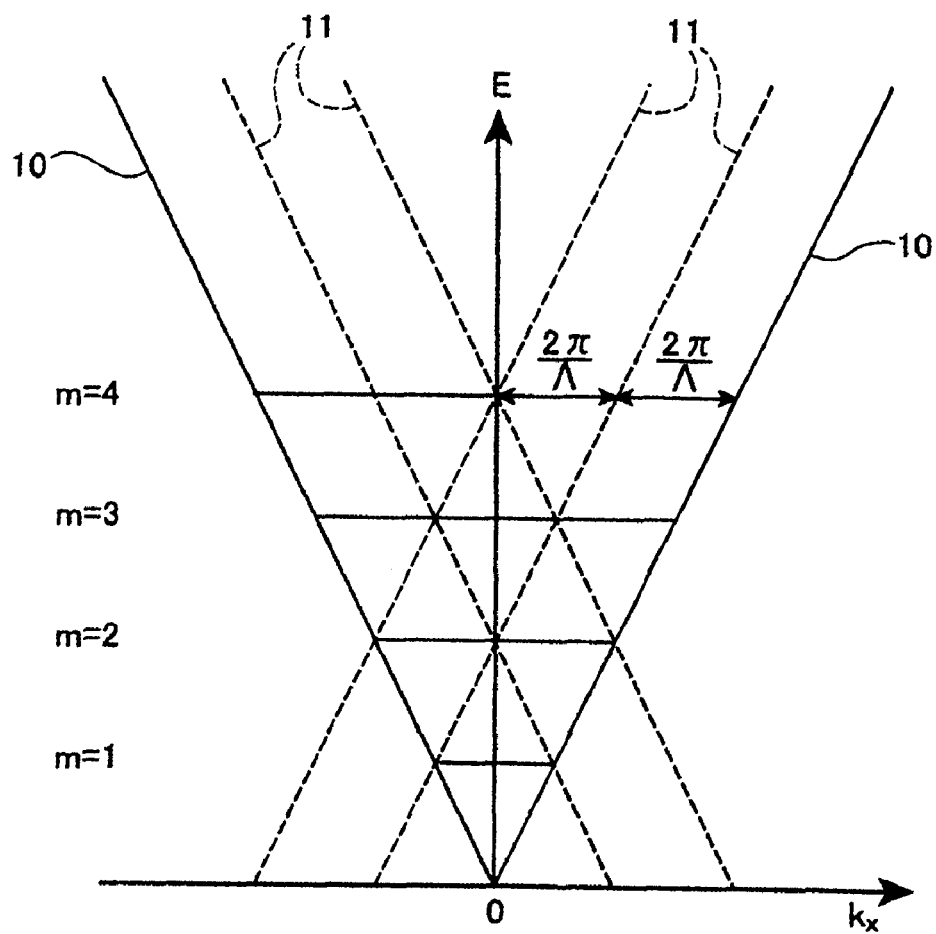
FIG. 2 is a diagram illustrating how the controllable light is dispersed in a grating.

At the outset, mention is made of how a controllable light is dispersed in a grating. FIG. 2 is a diagram illustrating how the controllable light 7 is dispersed in the grating waveguide 3. In the graphs of FIG. 2, the propagation vector $k_x$ of space harmonics propagating through the grating waveguide 3 is plotted along the abscissa axis while the photon energy E is plotted along the ordinate axis. The solid lines 10 represent a simplified dispersion relation of modes of light waves guided through the grating waveguide 3, and is expressed by equation:

$$E = hck_x/2\pi n^* \quad (1)$$

where h is Planck's constant, c is the velocity of light and n* is the effective refractive index of the waveguide. The broken lines 11 indicate dispersion relations of space harmonics diffracted by a reciprocal vector $G_m (=2\pi m/\Lambda$ where m is an integer and $\Lambda$ is the grating period). The space harmonics are coupled together at the points of intersection of these straight lines to form a standing wave whose energy is given by combining together a condition in which it is formed, namely $kx-(-kx)=G_m$, and the equation (1) above, as follows:

$$E = hcm/2n^*\Lambda \quad (2)$$

Mention is next made of the interaction between the exciton polariton and the standing wave existing in the polariton and photon interacting region 5.

Exciton polariton is a strongly coupled state of photon and exciton in a semiconductor.

Figure 3:
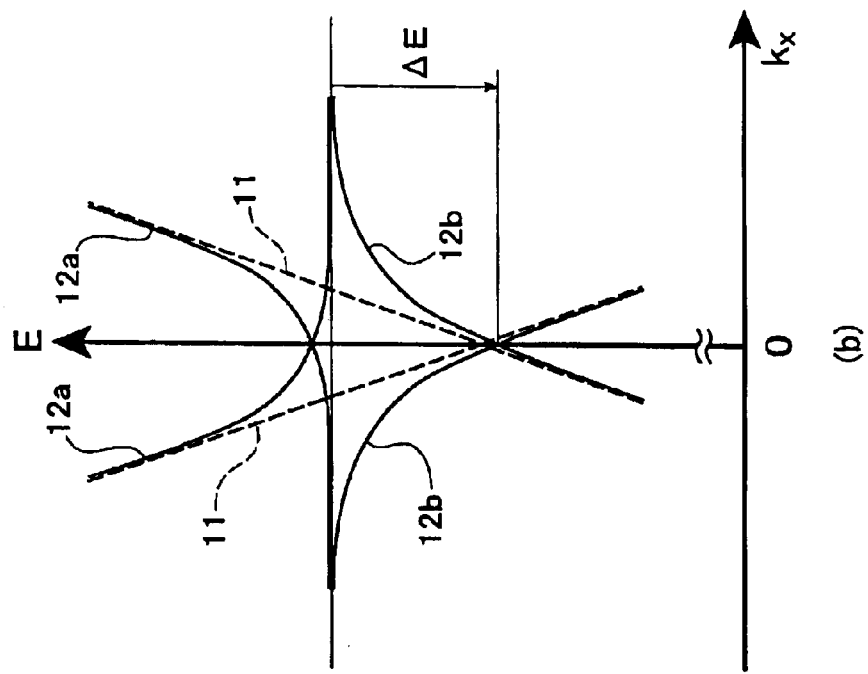
FIG. 3 is a diagram illustrating how the exciton polariton is dispersed.
Figure 3:
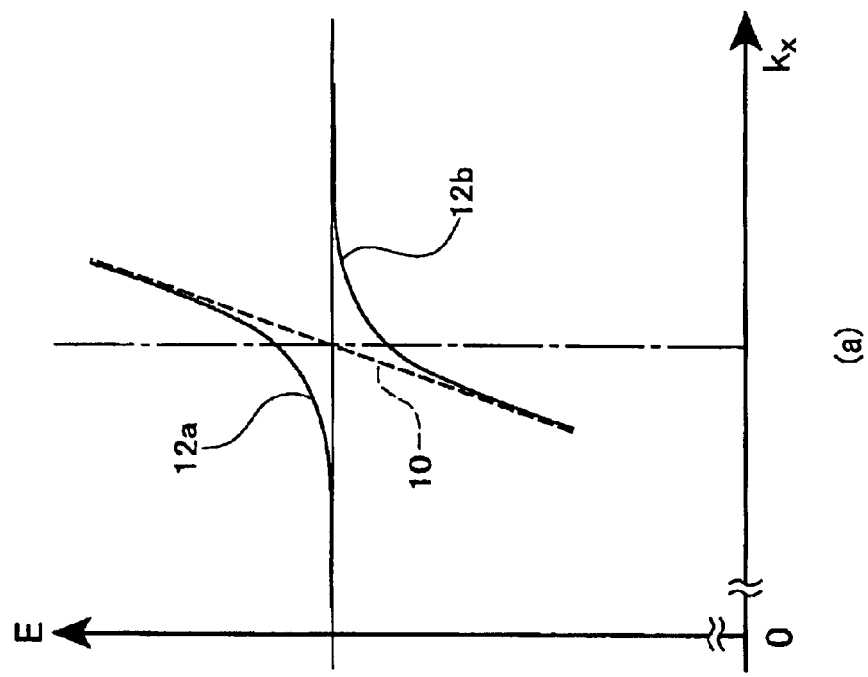

FIG. 3 shows how exciton polariton is dispersed. FIG. 3A is a diagram that illustrates dispersion relations, indicated by the solid lines 12a and 12b, for exciton polariton in a waveguide without a grating and a dispersion relation, indicated by the broken line 10, for a mode of light wave guided through the waveguide. $E_0$ represents exciton absorption energy. Exciton polariton, which is a strongly coupled state of photon and exciton in a semiconductor, has two eigenstates, and the dispersion relations attributable to these respective eigenstates are referred to as polariton's upper and lower branch modes (12a) and (12b), respectively.

FIG. 3B is a diagram that illustrates dispersion relations, indicated by the solid lines 12a and 12b, for exciton polariton in a waveguide with a grating, namely in the polariton and photon interacting region 5 here and dispersion relations, indicated by the broken lines 11, for a mode of light wave guided through the waveguide with the grating. $\Delta E$ represents dissociation energy, namely a difference between the energy of the standing wave given by the equation (2) and the exciton absorption energy $E_0$, and is given as follows:

$$\Delta E = hcm/2n^*\Lambda - E_0 \quad (3)$$

If $\Delta E$ is negative, then the exciton polariton corresponding to the lower branch modes 12b close in energy to the standing wave is excited and the standing wave is thereby absorbed. Thus, the controlled light 7 forming the standing wave in the polariton and photon interacting region 5 acts to excite exciton polariton and is thereby absorbed.

Mention is next made of how the transmissivity is controlled by the control light.

For controlling the position of the exciton polariton absorption dip with the control light 6, use is made of a light of a wavelength capable of giving rise to a third order nonlinear optical effect. To wit, irradiating the semiconductor layer 4 with the control light 6 of such a wavelength causes the energy of exciton to change rapidly and allows a dispersion relation of exciton polariton that is a strongly coupled state of exciton and photon, to so change, thereby permitting the photon energy of the standing wave strongly coupled to exciton in the semiconductor to so change. Since this phenomenon occurs in the femto-second (fs), an exciton polariton optical switch of the present invention can be operated in a terahertz (THz) band.

Mention is next made of the optical intensity extinction ratio of an exciton polariton optical switch according to the present invention.

To wit, good optical intensity extinction ratio requires a high probability at which the controlled light forming the standing wave in the polariton and photon interacting region 5 is strongly coupled with exciton polariton.

This in turn requires the semiconductor layer 4 to be of a multiple quantum well structure, the exciton oscillator intensity $f_{ex}$ to be large, and the exciton binding energy $E_b$ to be large. In the exciton polariton optical switch of the present invention, use is made of the semiconductor layer 4 having a multiple quantum well structure, a large exciton oscillator strength $f_{ex}$ and a large exciton binding energy $E_b$.

The semiconductor layer 4 for use in the exciton polariton optical switch of the present invention may be made of a layered or laminar inorganic-organic perovskite semiconductor that is expressed by chemical formula: $(C_nH_{2n+1}NH_3)_2MX_4$ where M=Pb or Sn, X=I, Br or Cl and n is a positive integer, and is hereinafter referred to as $C_{n-}MX_4$.

Figure 4:
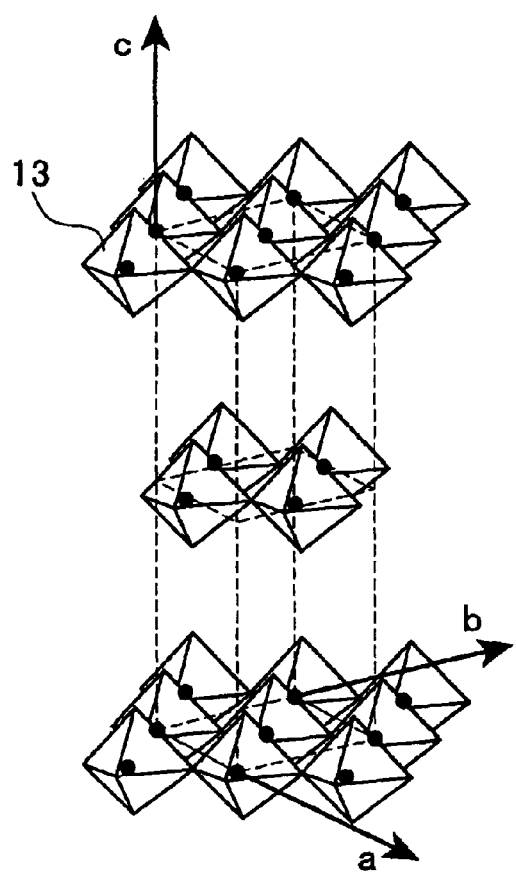
FIGS. 4A and 4B are schematic diagrams illustrating a structure of $C_n$-$MX_4$ used to form a semiconductor layer of an exciton polariton optical switch of the present invention where
Figure 4:
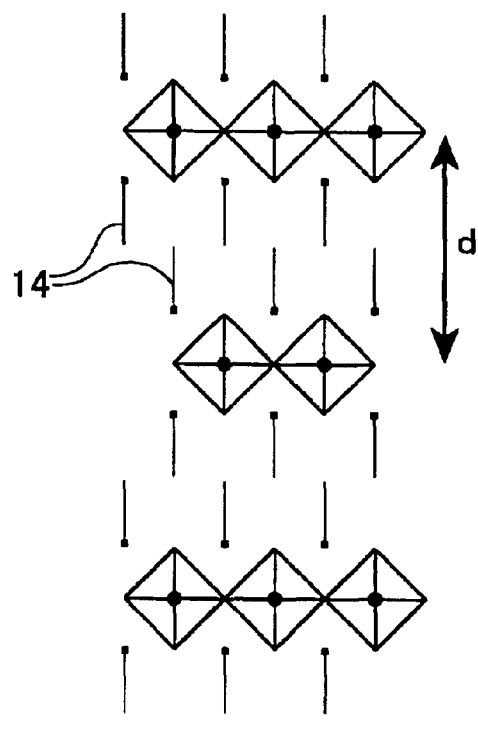

FIGS. 4A and 4B are schematic diagrams illustrating structures of $C_{n-}MX_4$ used to form the semiconductor layer 4 of an exciton polariton optical switch of the present invention wherein FIG. 4A shows a stereostructure of a unit cell (with the alkyl chain omitted) and FIG. 4B is a schematic projection diagram of its crystallographic structure in the directions of a- and b-axes.

The unit cell shown contains four (4) chemical units. $[MX_6]^{4-}$ octahedron 13 has an $X^-$ ion positioned at each of its apexes and a $M^{2+}$ ion positioned at its center (and indicated by the black circle); they are ionically bonded. Each of alkyl ammonium chains 14 has its $NH_4$ site positioned essentially at a center of four $X^-$ ions as ionically bonded at the same height as the $X^-$ ions, and extends externally from the $[MX_6]^{4-}$ octahedral layer 13. And, an electrically neutral layer is formed of the layered alkyl ammonium chains 14 and coupled to the $[MX_6]^{4-}$ octahedron 13 by a Van der Waals force.

The $[MX_6]^{4-}$ octahedral layer 13 is a semiconductor of direct transition type, wherein if M is Pb, the uppermost valence band is made up of the 6p orbital of $Pb^{2+}$ hybridized by the 5p orbital of $X^-$. For this reason, a large exciton oscillator intensity $f_{ex}$ and hence strong exciton absorption is exhibited. It is thus shown that the semiconductor layer 4 used in the present invention is of a large exciton oscillator intensity $f_{ex}$.

The alkyl ammonium chain layer 14 separating the $[MX_6]^{4-}$ octahedral layers 13 from one another is an insulator whose dielectric constant is small. Accordingly, the alkyl ammonium chain layer 14 can function as a barrier layer for the $[MX_6]^{4-}$ octahedral layers 13 so that the $[MX_6]^{4-}$ octahedral layers 13 and the alkyl ammonium chain layer 14 as their barrier layer together make up a quantum well. Such quantum wells layered in the direction of C-axis provide for a multiple quantum well structure. It is thus shown that the semiconductor layer 4 for use in the present invention is provided with a multiple quantum well structure.

It is further shown that the alkyl ammonium chain barrier layer 14 having a small dielectric constant is large in exciton binding energy.

Figure 5:
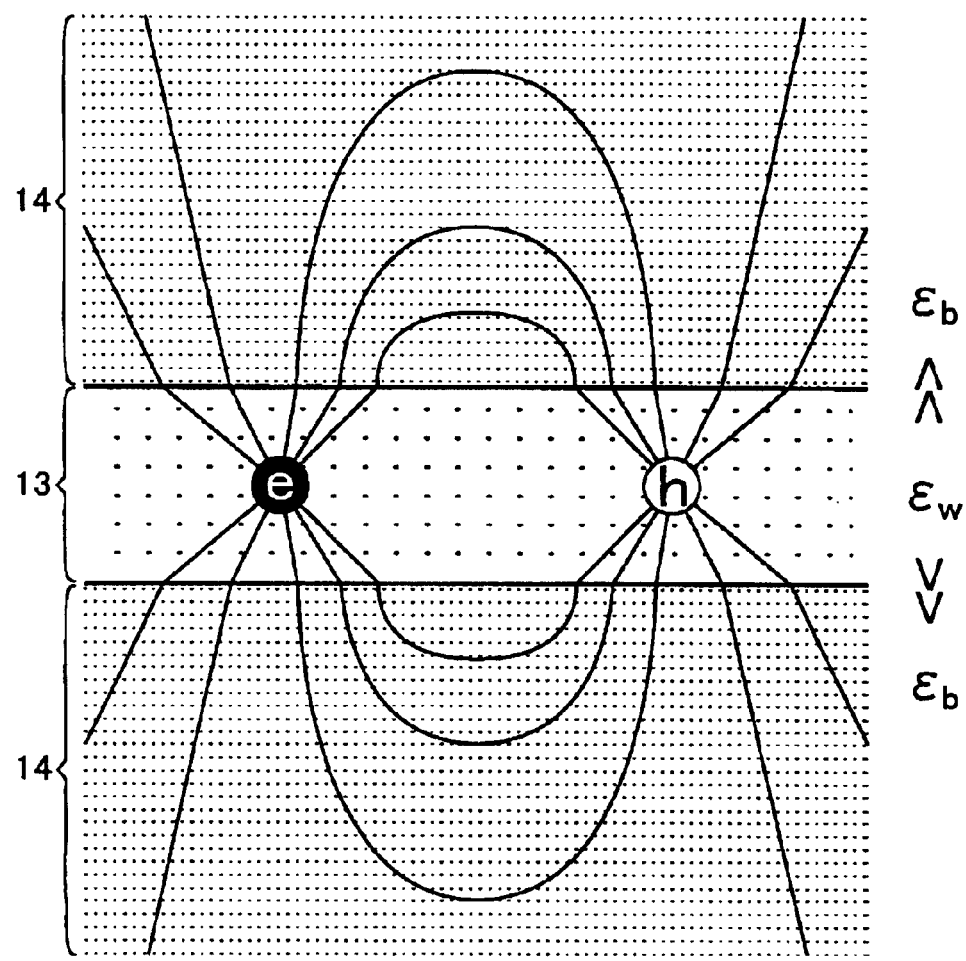
FIG. 5 is a diagram illustrating the distribution of electric flux lines of exciton in a quantum well layer in the semiconductor layer of an exciton polariton optical switch of the present invention.

FIG. 5 shows the distribution of electric flux lines of exciton in a quantum well layer as mentioned above, in which e and h represent an electron and a hole, respectively. The dielectric constant of the $[MX_6]^{4-}$ octahedral layers 13 as the quantum wells and the dielectric constant of the alkyl ammonium chain layers 14 as the barrier layers are represented by $\epsilon_w$ and $\epsilon_b$, respectively.

As will be apparent from the distribution of electric flux lines shown in FIG. 5, the electron e and the hole h which make up the exciton here are effectively acted on by the Coulomb interaction through the alkyl ammonium chain layer 14 as the barrier layer that is small in dielectric constant, and therefore provide for a large exciton binding energy $E_b$.

In a specific implementation of the present invention, use is made of M=Pb, X=I and the alkyl ammonium chain= $(C_6H_5C_2H_4NH_3)$, namely of a layered or laminar perovskite semiconductor of the lead iodide family (hereinafter referred to as PhE-PbI4). FIG. 6 shows actual measurements of exciton binding energy $E_b$, band gap $E_g$, exciton absorbing energy $E_{ex}$, exciton oscillator intensity $f_{ex}$, quantum well width $L_{well}$, quantum well dielectric constant $\epsilon_w$ and barrier layer dielectric constant $\epsilon_b$ of PhE-PbI4 used.

It is thus shown that the exciton polariton optical switch according to the present invention using the semiconductor layer 4 having a multiple quantum well structure and having large exciton binding energy $E_b$, and large exciton oscillator intensity $f_{ex}$ as seen from FIG. 6 is high in light intensity extinction ratio. Further, it is operable at a room temperature.

Mention is next made in detail of this specific implementation of the invention.

Figure 7:
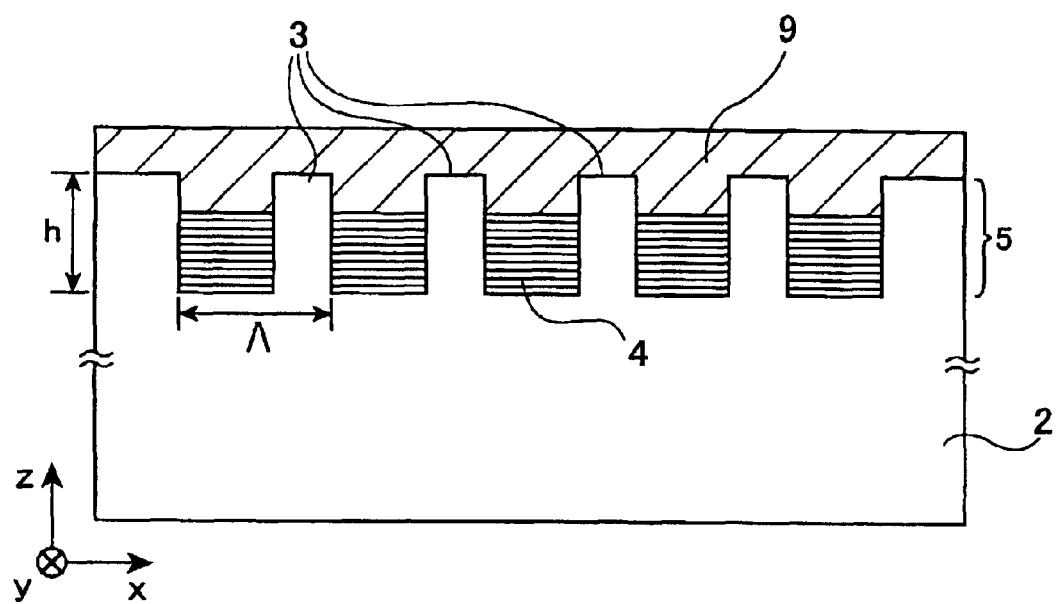
FIG. 7 is a typical cross sectional view illustrating the makeup of an exciton polariton optical switch used in the specific implementation.

FIG. 7 is a view showing the makeup of the exciton polariton optical switch here implemented. The makeup of the exciton polariton optical switch shown in FIG. 7 differs from that shown in FIG. 1 in that the grooves of the grating 3 are filled with semiconductor layers 4 up to a certain depth lower than their upper ends and that for the sake of improving their optical confinement, the top faces of these semiconductor layers are covered with a transparent dielectric layer 9 of high refractivity, e.g., a polyethylene layer 9. In this implementation, the grating 3 is formed by etching the surface of a quartz substrate 2. The grating has a depth h of 0.3 $\mu$m, a line and space ratio r of 1:4, and an area of 1.5 mm×1.5 mm. Five such gratings were prepared having different grating periods $\Lambda$ of 700 nm, 680 nm, 660 nm, 640 nm and 620 nm, respectively. Use is made of PhE-PbI4 for the semiconductor layers 4.

Figure 8:
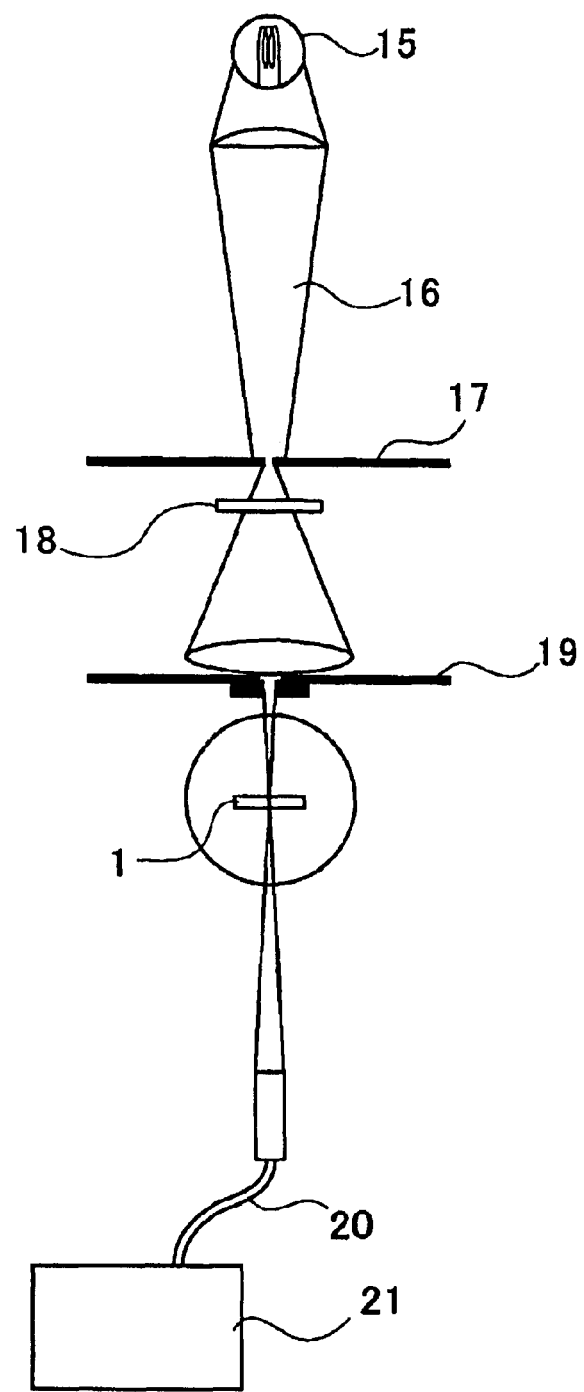
FIG. 8 is a diagram illustrating a measuring system used for the measurement of transmission spectra in the specific implementation.

FIG. 8 is a diagram illustrating a measuring system used for the measurement of transmission spectra in the specific implementation. For the light source, use is made of an iodine (halogen) lamp 15 as a white light source, whose output light 16 is condensed into a pin hole 17, of which an output light 16 is polarized through a polarizing plate 18. The direction of polarization is made parallel to a groove in the grating 3 of the exciton polariton optical switch 1. The polarized output light 16 is condensed through an iris 19 on the obverse of the exciton polariton optical switch 1. The light transmitted through and out of the exciton and polariton optical switch 1 is condensed into a fiberoptical condenser 20 and is measured by a spectrometer 21 to obtain its transmission spectra.

Figure 9:
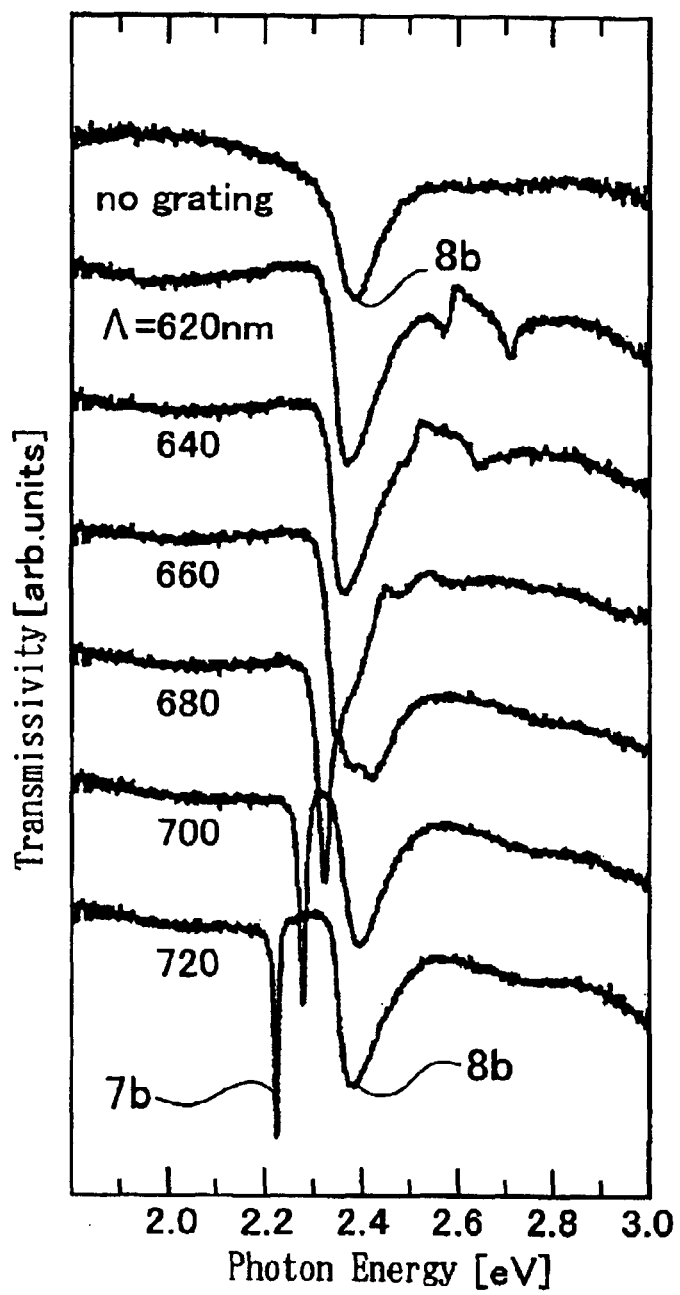
FIG. 9 is a diagram illustrating the transmission spectra of the exciton polariton optical switch in the specific implementation.

FIG. 9 is a diagram illustrating the transmission spectra of the exciton polariton optical switch in this specific implementation. In the diagram, the photon energy is plotted along the abscissa axis while the transmission is plotted along the ordinate axis. Six specimens are used for the measurement, including those having the grating periods of 700 nm, 680 nm, 660 nm, 640 nm and 620 nm and a comparative specimen that is devoid of the grating.

As is seen from FIG. 9, an absorption dip 7b appears in the side lower in energy than where an exciton absorption dip 8b appears, and is shifted more to the lower energy side as the grating period $\Lambda$ becomes greater, from which it is apparent that this absorption dip is an exciton polariton absorption dip.

Mention is next made of the working speed of the exciton polariton optical switch in this implementation.

Figure 10:
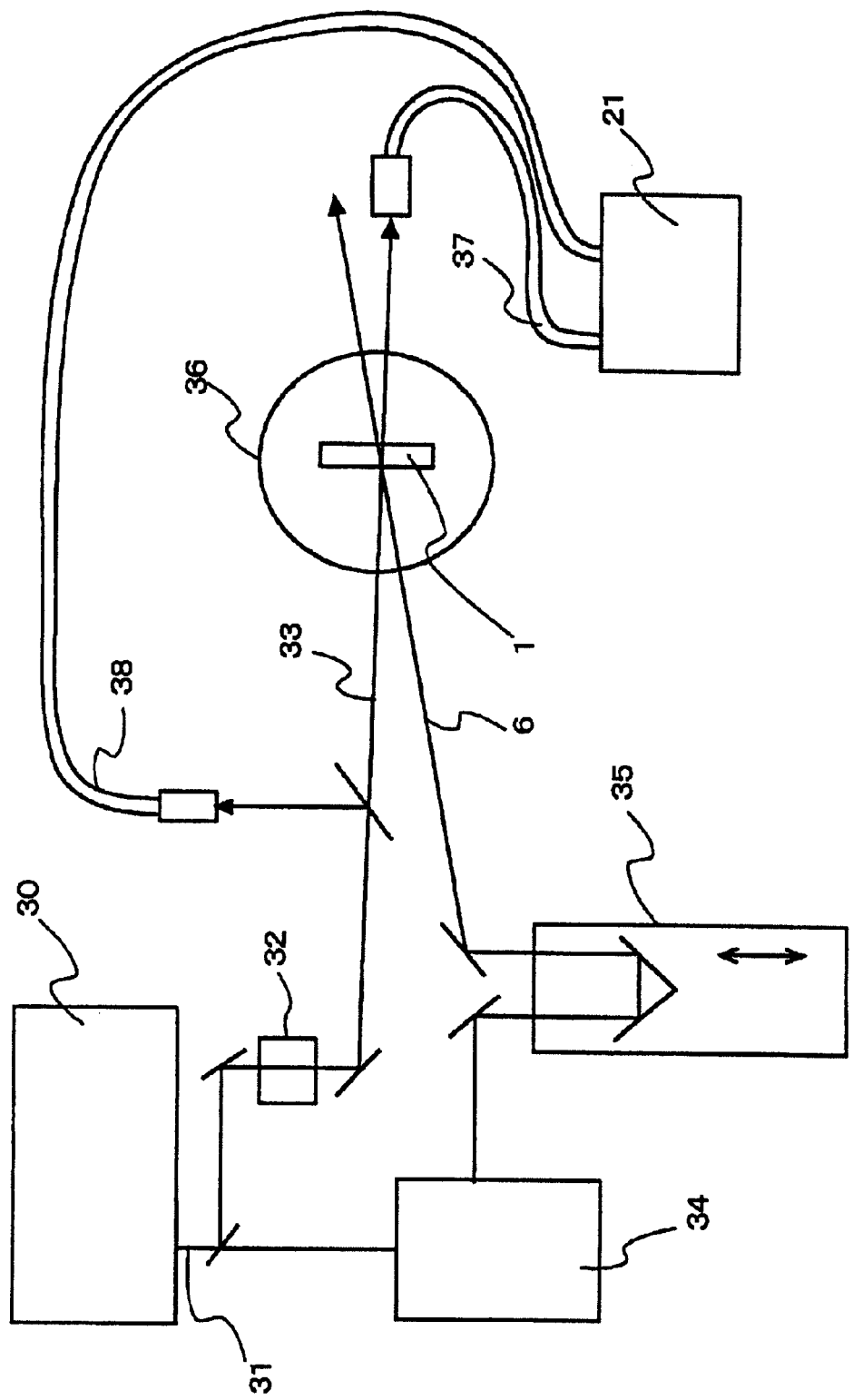
FIG. 10 is a schematic diagram illustrating a measuring system used for the measurement of the working speed of the exciton polariton optical switch in the specific implementation.

FIG. 10 is a schematic diagram illustrating a measuring system used for the measurement of the working speed of the exciton polariton optical switch in this specific implementation.

A laser pulse 31 of a wavelength of 760 nm and a time half-width of 150 fs is generated by a laser light source 30 comprising an Er-doped fiber laser and a titanium-sapphire regenerative amplifier and is split into two, with one of which a deuterium oxide cell 32 is irradiated to produce a white light 33 and the other of which is converted by an optical parametric oscillator 34 into a control light 6 having a wavelength of 538 nm. The control light 6 has its delay time from the white light 33 adjusted by a delay time controller 35 that adjusts the optical length of the control light 6 to adjust the delay time. The exciton polariton optical switch 1 disposed in a thermostatic chamber 36 is irradiated with the white light 33 and the control lights 6 delayed thereafter with various delay times, and the white light 33 transmitted through the exciton polariton optical switch 1 is condensed with a fiberoptical condenser 37 and guided to a spectrometer 21 to measure out its transmission spectrum. Here, a portion of the white light is taken out with the fiberoptical condenser 37 to normalize the transmission spectrum.

Each control light 6 has a central wavelength of 538 nm, a light energy density of 30 $\mu$J/cm$^2$, a time half-width of 200 fs and a repetition rate of 1 kHz. The control light 6 is made incident on the obverse of the exciton polariton optical switch 1 with an angle of inclination of 3 degrees to a normal thereto. The polarization direction of the light is made parallel to the grating grooves. The measurements were performed at the room temperature. The differential transmission spectrum is a spectrum represented by a difference from the transmission spectrum in the absence of the control light.

Figure 11:
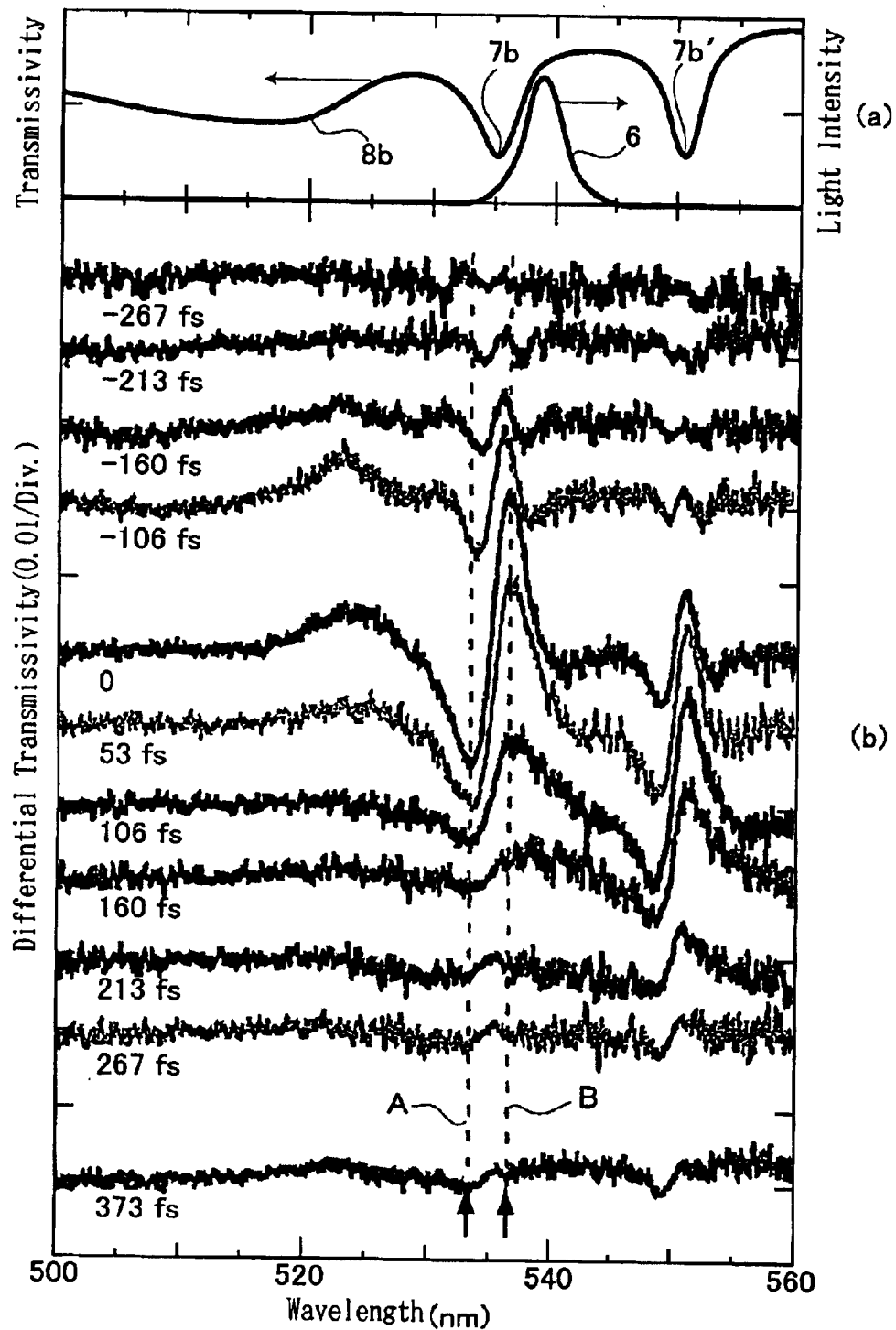
FIG. 11 is a diagram illustrating changes of transmissivity of the exciton polariton optical switch with time in the specific implementation wherein (A) shows its linear transmissivity plotted along the left hand side ordinate axis and the spectrum of a control light in terms of the light intensity plotted along the right hand side ordinate axis, both with respect to the wavelength plotted along the abscissa axis and (B) shows differential spectra which were measured out with the delay time shifted approximately every 53 fs and which are plotted along the ordinate axis with respect to the wavelength plotted along the abscissa axis.

FIG. 11 is a diagram illustrating changes with time of transmissions of the exciton polariton optical switch in this specific implementation wherein (A) shows its linear transmissivity in the absence of the control light plotted along the left hand side ordinate axis and the spectrum of a control light in terms of the light intensity plotted along the right hand side ordinate axis, both with respect to the wavelength plotted along the abscissa axis and (B) shows differential spectra which were measured out with the delay times shifted approximately every 53 fs and which are plotted along the ordinate axis with respect to the wavelength plotted along the abscissa axis.

In FIG. 11(A), there are seen a wide dip 8b broadened centering on a wavelength of 520 nm, which is due to the semiconductor layer exciton absorption, and sharp dips 7b and 7b' at wavelengths of 535 nm and 550 nm, respectively, which are the exciton polariton absorption dips. In FIG. 11(B), changes of the differential transmission spectra with the varying delay time between the broken lines A and B in a wavelength region indicate the dip 7b shown in FIG. 11(A) shifting successively under the influence of irradiation with the control light 6.

As will be apparent from this diagram, with the lapse of time an increase in the transmission occurs in the side longer in wavelength than the center of the dip 7b (center between the broken lines A and B) and a decrease in the transmission occurs in the side shorter in wavelength than the center of the dip 7b, thus revealing that the dip 7b under the influence of irradiation with the control light 6 shifts towards the higher energy side.

Figure 12:
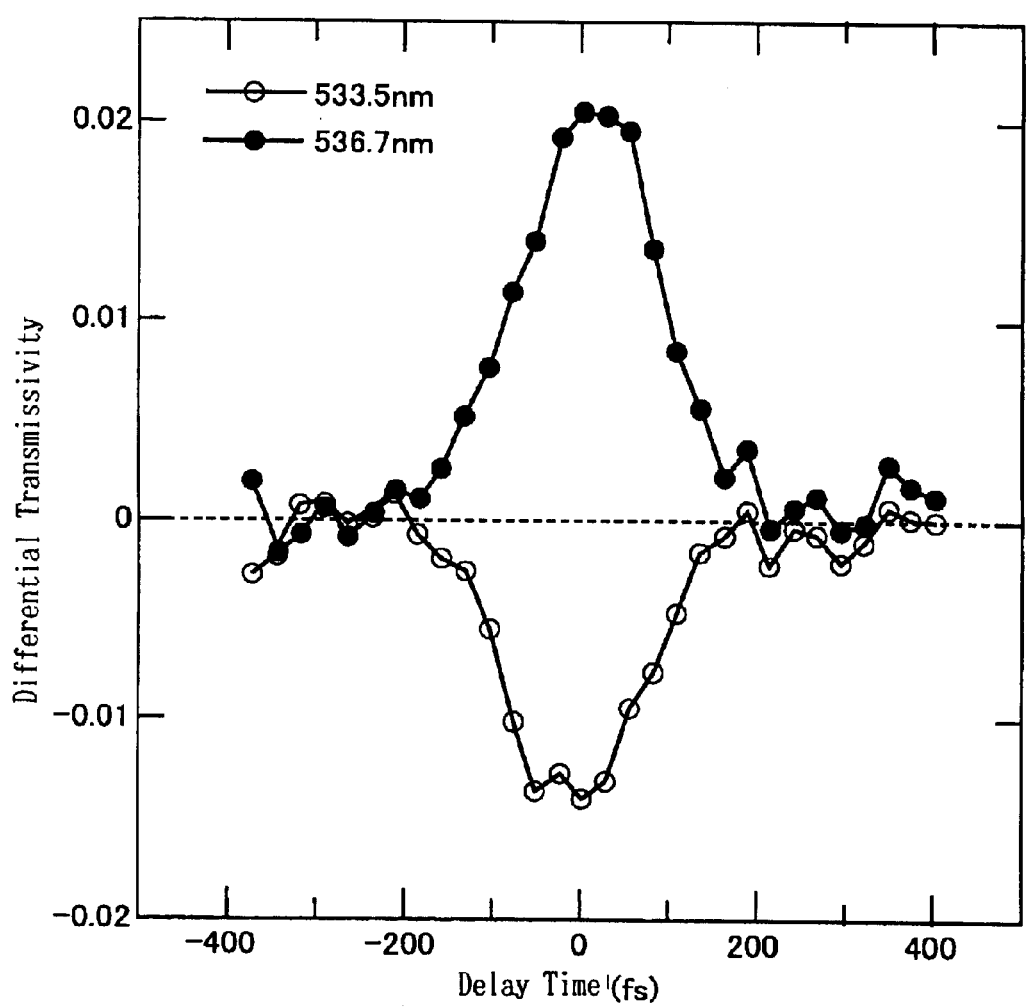
FIG. 12 is a graph illustrating the dependency upon the delay time of each of the differential transmissions shown at the broken lines A and B (wave lengths: 533.5 nm and 536.7 nm) in the diagram of FIG. 11(B).

FIG. 12 is a graph illustrating the dependency upon the delay time of each of the differential transmissions shown at the broken lines A and B (wave lengths: 533.5 nm and 536.7 nm) in the diagram of FIG. 11(B). In the graph, the delay time is plotted along the abscissa axis and the intensity of the differential transmission is plotted along the ordinate axis.

As will be apparent from this graph, the time half-width is about 200 fs, which is the same as that of the control light 6.

From these results it is seen that the exciton polariton optical switch of the present invention is operable at a frequency of at least 5 THz or higher, and from the peak value in this graph and its background values it is also seen that the optical switch is extremely high in light intensity extinction ratio.

The phenomenon that the dip under the influence of control light irradiation shifts at an extra-high speed is considered as follows: It has hitherto been known that irradiating with a light of energy lower than the exciton absorbing energy at a high intensity shifts the exciton absorbing energy rapidly to the higher energy side. This phenomenon, called the "optical Stark effect", has been understood to be due to a dressed state that exciton is dressed with photon.

The phenomenon that irradiation with control light causes the dip to very rapidly shift is considered to be due to the fact that the optical Stark effect causes the exciton energy to change very rapidly, which in turn changes the dispersion relation of the exciton polariton which is a state that exciton and photon are strongly coupled, thereby changing the dip energy.

INDUSTRIAL APPLICABILITY

As will have been appreciated from the foregoing description, the optical switch according to the present invention is an exciton polariton optical switch that is excellent in light intensity extinction ratio and that is operable at an ultra-high speed in the terahertz order, and hence is extremely useful when used as an optical switch to be working very rapidly.

What is claimed is:

1. An exciton polariton optical switch, characterized in that it comprises:

a polariton and photon interacting region made of a grating formed on a top face of a transparent substrate and a semiconductor layer with which said grating is covered;

a controllable light emitted from a free space and having a selected wavelength and with which said polariton and photon interacting region is irradiated; and a control means for controlling transmissivity of said controllable light through said polariton and photon interacting region.

2. An exciton polariton optical switch as set forth in claim 1, characterized in that said third order optical nonlinear effect is an optical Stark effect of exciton.

3. An exciton polariton optical switch as set forth in claim 1, characterized in that said grating is formed so that its grating period corresponds to a length of m/2 of the wavelength of said controllable light in said semiconductor layer where m is a positive integer.

4. An exciton polariton optical switch as set forth in claim 1, characterized in that said semiconductor layer is layered in a groove of said grating to a preestablished depth.

5. An exciton polariton optical switch as set forth in claim 1, characterized in that said semiconductor layer is a semiconductor layer that is large in both exciton oscillator strength and exciton binding energy.

6. An exciton polariton optical switch as set forth in claim 5, characterized in that said semiconductor layer that is large in both exciton oscillator strength and exciton binding energy is a semiconductor layer having a multiple quantum well structure made of units each of which comprises a pair of semiconductor quantum wells and a barrier layer small in dielectric constant and separating said semiconductor quantum wells from each other.

7. An exciton polariton optical switch as set forth in claim 6, characterized in that said multiple quantum well structure that is large in both exciton oscillator strength and exciton binding energy is of a laminar or layered inorganic-organic perovskite semiconductor that is expressed by chemical formula: $(C_nH_{2n+1}NH_3)_2MX_4$ where M=Pb or Sn and X=I, Br or Cl and n is a positive integer.

8. An exciton polariton optical switch as set forth in claim 1, characterized in that said polariton and photon interacting region is formed on its top face with a highly refractive transparent material for light confinement.

9. An exciton polariton optical switch as set forth in claim 8, characterized in that said highly refractive transparent material for light confinement is a polymer.

* * * * *